United States Patent
Berman (10) Patent No.: US 6,799,465 B2
(45) Date of Patent: Oct. 5, 2004

(54) SHOCK WAVE VIBRATION GENERATOR FOR MEASURING OR TESTING OR IMAGING PURPOSES

(76) Inventor: Stephen Bruce Berman, 1601 Lipan Trail, Austin, TX (US) 78733

( * ) Notice: Subject to any disclaimer, the term of this patent is extended or adjusted under 35 U.S.C. 154(b) by 63 days.

(21) Appl. No.: 10/159,337

(22) Filed: Jul. 16, 2002

(65) Prior Publication Data

US 2004/0011136 A1 Jan. 22, 2004

(51) Int. Cl.$^7$ ................................................ G01N 29/00
(52) U.S. Cl. ........................................................ 73/590
(58) Field of Search ......................... 73/590, 662, 592, 73/52, 54, 28, 54.41, 61.75, 61.49, 586, DIG. 1

(56) References Cited

U.S. PATENT DOCUMENTS 5,592,283 A * 1/1997 Flesher et al. ................ 356/72

* cited by examiner

*Primary Examiner*—Helen Kwok (57) ABSTRACT

A shock wave vibration generator system is disclosed and includes methods and apparatus that sever objects and thereby produce shock waves. The shock waves then may be focused and coupled to objects for measuring or testing. The shock wave generator may be utilized for a sound source for imaging such as in ultrasound or sonar.

29 Claims, 10 Drawing Sheets

SHOCK WAVE VIBRATION GENERATOR FOR MEASURING OR TESTING OR IMAGING PURPOSES

TECHNICAL FIELD

This invention relates to vibrator device systems and more particularly to shock wave vibratory forces produced by, for example, one or more cavitating spaces and applied to one or more bodies for, for example, measuring purposes, testing, or imaging purposes

BACKGROUND ART

A useful application of vibratory forces involves subjecting one or more bodies to vibratory forces to determine qualities, characteristics, conditions, and for examination, inspection, material characterization, and imaging of internal and external structures. Vibrator devices have been particularly constructed and adapted for producing and applying vibratory forces to one or more bodies including one or more test bodies. Methods and devices have also been developed to temporally control the vibrator devices, to display and record information about the temporal control of the vibrator devices, and to record the temporal control of information. Methods and devices have also been developed for analyzing information about the temporal control of the vibrator devices, for displaying the analyzed temporal control information, and for recording the analyzed information. Methods and devices have also been developed for spatial control of vibrator devices and for displaying and recording spatial control information of vibrator devices. Methods and devices have also been developed for the analysis of the spatial control information, and for the display and recording of analyzed information about the spatial control of vibrator devices. Methods and devices have also been developed for receiving and transducing one or more vibratory forces propagated by any transmission through, reflection from, or refraction by one or more bodies. Methods and devices have also been developed for displaying and recording the received and transduced vibratory forces. Methods and devices have also been developed for analysis of the received and transduced one or more vibratory forces and for display and recording of the one or more analyzed vibratory forces.

Methods and devices particularly adapted for producing and applying vibratory forces to one or more bodies for test purposes or measurement purposes have applied vibratory forces that are not shock waves or produced from shock waves.

Figure 1:
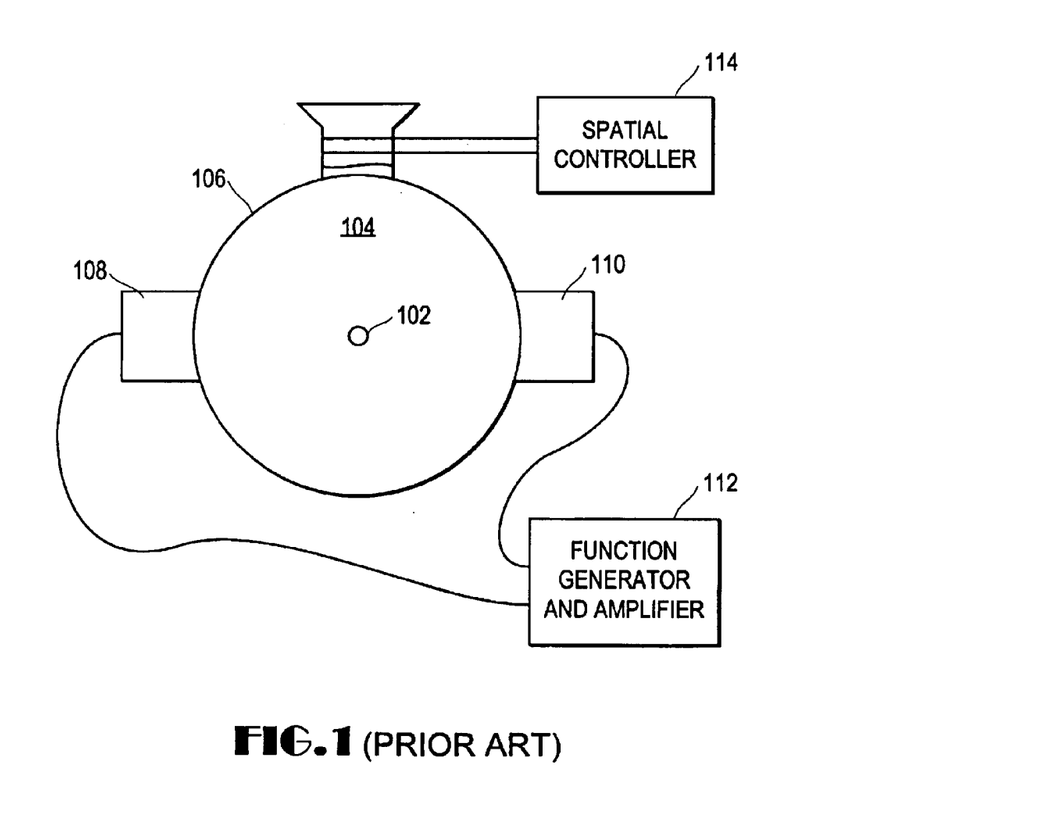
FIG. 1 labeled prior art, is a vibrator apparatus for producing cavitating space within a liquid.

Referring to FIG. 1, a cavitating space 102 (not necessarily to scale) may be generated with a vibrator device 101 having liquid water 104 within glass housing 106. The cavitating space 102 may be generated by producing sound waves in the liquid water 104 at approximately 20–25 kHz using polarized piezoelectric transducers 108 and 110 of the vibrator device 1. The cavitating space produces shock waves in liquid water 104. Driving signals for piezoelectric transducers 108 and 110 are generated and monitored by function generator and amplifier 112. Thus, function generator and amplifier 112 provide temporal control of the shock waves produced by the cavitating space 102. Spatial control of the cavitating space 102 is maintained in part by spatial controller 113, which may be a pivotal, mechanical support mechanism. Methods for construction of vibrator devices that produce shock wave vibratory forces by using cavitating spaces within liquid water in glass housings driven by piezoelectric drivers have been described in Scientific American, pages 46–51 and 96–98 of vol. 272, no. 2, February, 1995, and Science News, pages 266–267, vol. 147, no. 17, Apr. 29, 1995.

DISCLOSURE OF INVENTION

In one embodiment, the presently disclosed shock wave vibratory system and method of utilizing vibrator devices that produce shock wave vibratory forces may replace and provide superior, for example, imaging and analysis of bodies relative to vibratory systems that produce and apply non-shock wave vibratory forces.

In one embodiment of the present invention, one or more shock wave vibrations are produced by, for example, one or more cavitating spaces within one or more fluid substances within one or more housings. Vibratory force, that is a shock wave, is transmitted through, reflected from, and/or refracted by bodies or test bodies in a manner generally unlike non-shock wave vibratory force. Shock wave vibratory force is, in general, a limiting form of vibratory force.

In one embodiment of the present invention, one or more shock wave vibrations are produced by, for example, cutting elements severing an object such as wire. A distal end of the severed object is disposed proximate to a body, and the shock wave propagates down the severed object and is transmitted to the body. The vibratory forces produced in the body by the shock wave may be detected and analyzed for, for example, measuring purposes, test purposes, imaging, characterizing, examining, inspecting, or obtaining other information about the body.

In one embodiment of the present invention, a method of constructing vibrator devices particularly adapted for producing and applying shock wave vibratory forces to one or more bodies for measuring purposes or testing purposes is provided.

In one embodiment of the present invention, a method of producing shock wave vibratory forces within a fluid substance confined by a housing for application to one or more bodies for measuring purposes, test purposes, imaging, characterizing, examining, inspecting, or obtaining other information about the one or more bodies. Shock wave vibration is of a duration that allows shock wave vibratory forces to be produced singularly or in trains at any rate up to and including ultrasonic rates.

In one embodiment of the present invention, a method utilizes one or more shock wave vibratory forces produced by one or more cavitating spaces within one or more fluid substances within one or more housings which is therefore an improvement of the art of methods for producing vibrator devices that are particularly adapted for producing and applying non-shock wave vibratory forces for, for example, any testing purposes or any measuring purposes.

BRIEF DESCRIPTION OF DRAWINGS

Reference numerals referring to the same feature appearing in multiple figures are the same.

MODE(S) FOR CARRYING OUT THE INVENTION

The following description of the invention is intended to be illustrative only and not limiting.

To, for example, image, characterize, examine, inspect or obtain other information about a body, a shock wave vibratory system utilizes shock wave vibratory forces which in one embodiment are generated by cavitating spaces in a fluid substance confined within a housing. In other embodiments, the shock wave vibratory forces are generated by an explosive device within a housing and a cutting device to generate shock wave vibratory forces in a severed object for transmission to a body. The shock wave vibratory forces may be coupled to the body and exhibit superior propagation properties within and through the body and may provide high resolution information. After reception of the vibratory force information and transduction into electrical signals, the information may be, for example, recorded, analyzed, and displayed. The frequency of shock wave vibratory force generation may be controlled using a temporal control device and location of the system and location of the shock wave vibratory system may be controlled with a spatial control device. The frequency of generation is variable and includes subultrasonic and ultrasonic generation frequencies.

Vibrator devices may be constructed by methods and devices using materials known to ones experienced in the prior arts to generate cavitating spaces within one or more fluid substance disposed within one or more housings. The vibrator devices may, for example, be driven by one or more piezoelectric drivers to thereby produce one or more shock wave vibratory forces.

The vibrator devices may be further equipped for, for example, any measuring purposes or testing purposes with one or more devices, which are well known to those of ordinary skill in the art, that provide temporal control of the cavitating spaces, that display and record information about the temporal control of the cavitating spaces, and that display recorded information about the temporal control of the cavitating spaces. The vibrator devices may be further equipped with one or more devices, which are well known to those of ordinary skill in the art, that analyze information about the temporal control of the cavitating spaces and that display and record analyzed information about the temporal control of the cavitating spaces.

The vibrator devices may be further equipped for, for example, any measuring purposes or testing purposes with one or more devices, which are well known to those of ordinary skill in the art, that provide spatial control of the cavitating spaces, that display and record information about the spatial control of the cavitating spaces and that display recorded information about the spatial control of the cavitating spaces. The vibrator devices may be further equipped with one or more devices, which are well known to those of ordinary skill in the art, that analyze information about the spatial control of the cavitating spaces and display recorded analyzed information about the spatial control of the cavitating spaces.

The vibrator devices may be further equipped for, for example, any measuring purposes or testing purposes with one or more devices, which are well known to those of ordinary skill in the art, that couple the produced one or more shock wave vibratory forces to one or more bodies, such as test bodies, by any gas interfaces or any liquid interfaces or any solid interfaces.

The vibrator devices may be further equipped for, for example, any measuring purposes or testing purposes with one or more devices, which are well known to those of ordinary skill in the art, for receiving and transducing at any times or any spatial locations one or more vibratory forces, such as shock waves and non-shock waves, that have been coupled to and propagated by any transmission through, any reflection from, and any refraction by one or more bodies or one or more test bodies. The vibrator devices may be further equipped with one or more devices, which are well known to those of ordinary skill in the art, for display and recording of information about received and transduced vibratory forces that have been propagated by any transmission through or any reflection from or any refraction by one or more bodies or one or more test bodies. The vibrator devices may be further equipped with one or more devices, which are well known to those of ordinary skill in the art, for display of recorded information, analysis of information, display of analyzed information, and recording of analyzed information about received and transduced shock wave vibratory forces that have been propagated by any transmission through or any reflection from or any refraction by one or more bodies or one or more test bodies.

Figure 2:
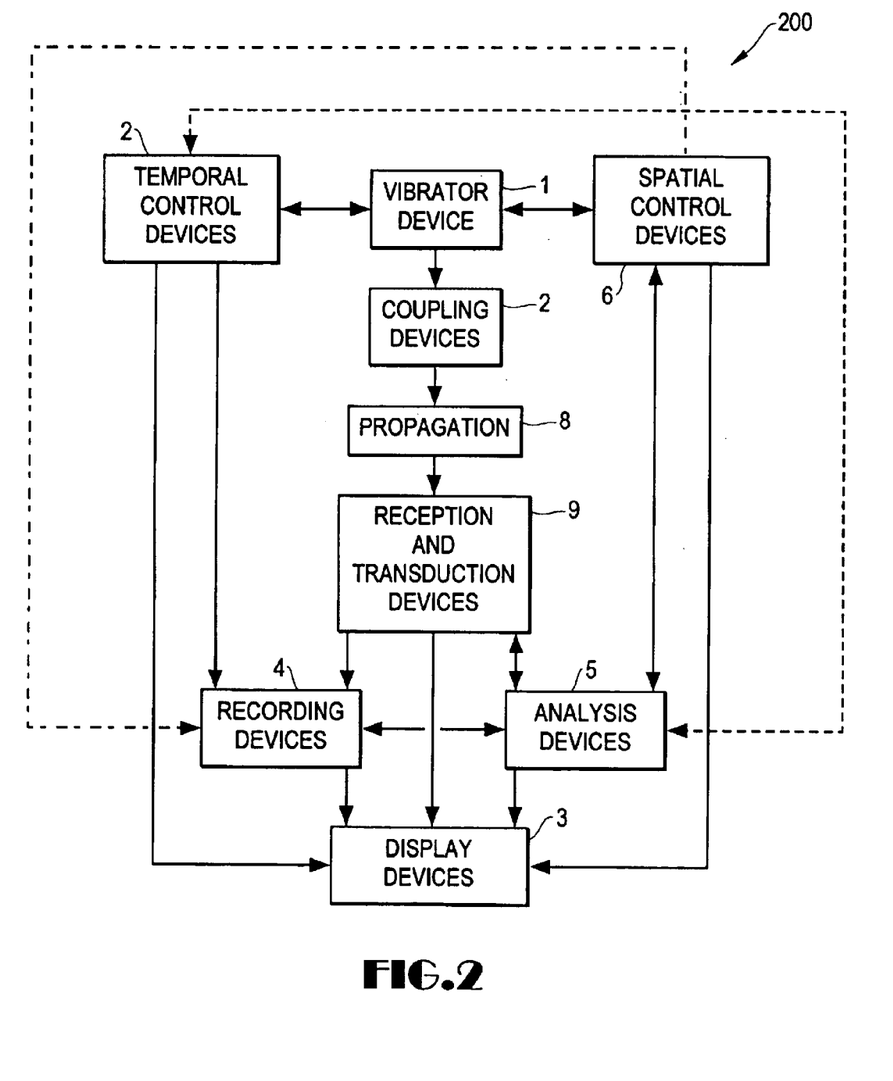
FIG. 2 is a shock wave vibratory system which produces and couples propagating shock wave vibratory forces to a body.

Referring to FIG. 2, the block diagram of shock wave vibratory system 200 illustrates the use of a vibrator device 1 such as vibrator device 101 (FIG. 1) for, for example, any measuring purposes or any testing purposes. The vibrator device 1 is constructed to produce shock waves by, for example, producing one or more cavitating spaces within one or more fluid substances, such as liquid water 104, disposed within a housing of the vibrator device 1. Cavitating spaces within a fluid substance are driven by, for example, one or more piezoelectric drivers. Cavitating spaces collapse at supersonic velocities to produce one or more shock wave vibratory forces.

The produced shock wave vibratory forces are controlled by one or more temporal control devices 2, such as the function generator and amplifier 112 (FIG. 1). The temporal control devices 2 communicate information about the temporal control of cavitating spaces to display devices 3, to recording devices 4, and to analysis devices 5. The recording devices 4 communicate with display devices 3. The analysis devices 5 communicate with display devices 3 and recording devices 4.

The produced shock wave vibratory forces are controlled by one or more spatial control devices 6 which communicate information about the spatial control of the cavitating space to display devices 3 and to recording devices 4. Recording devices 4 communicate with display devices 3, and the spatial control devices 6 also communicate information about the spatial control of the cavitating spaces with analysis devices 5. Analysis devices 5 communicate with display devices 3 and recording devices 4.

The produced shock wave vibratory forces are coupled to one or more bodies, such as test bodies, by any gas interfaces, any liquid interfaces, or any solid interfaces 7. The coupled shock wave vibratory forces propagate 8 by any transmission through, any reflection from, and any refraction by one or more bodies or one or more test bodies 8 and are received and transduced by one or more receiving transducer devices 9 at any time or any spatial locations. The shock wave vibratory force receiving transducer devices 9 communicate with display devices 3, recording devices 4, and analysis devices 5. The recording devices 4 communicate with display devices 3, and the analysis devices 5 communicate with display devices 3 and recording devices 4.

Figure 3:
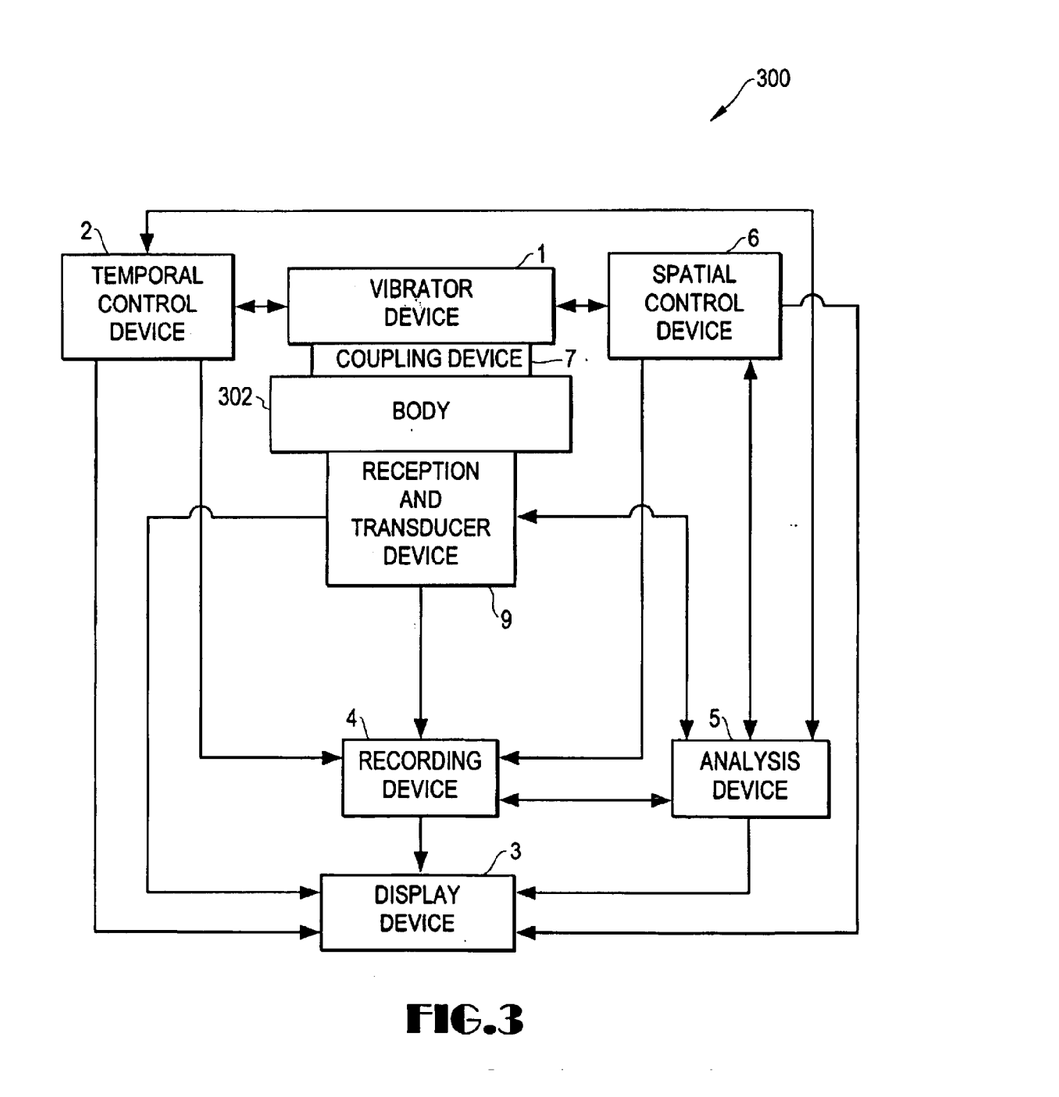
FIG. 3 is an embodiment of the shock wave vibratory system of FIG. 2.
Figure 4:
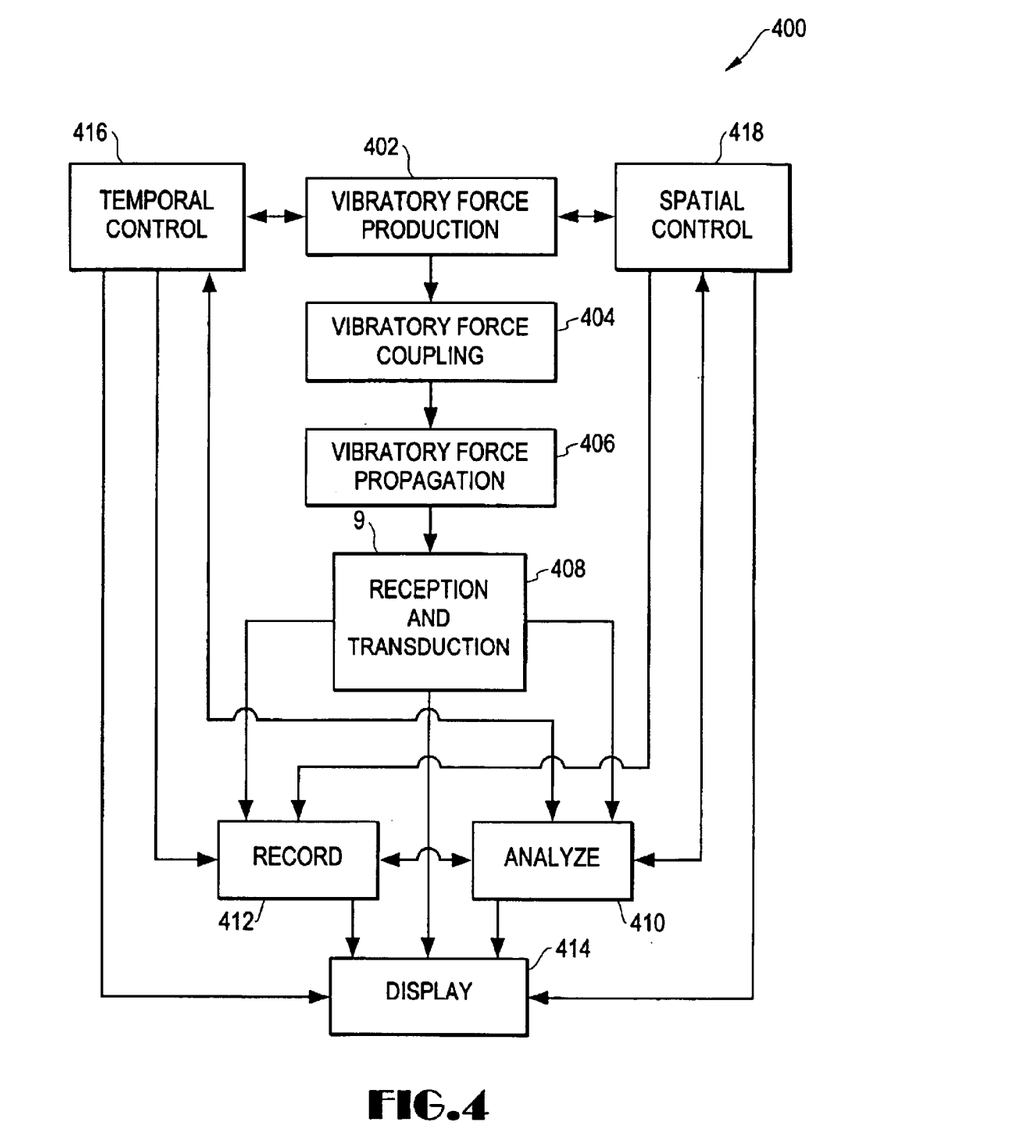
FIG. 4 is a functional block diagram of a method of utilizing vibrator devices which produce shock wave vibratory forces.

Referring to FIGS. 3 and 4, a vibrator device and shock wave force utilization operation 400 utilizes, for example, shock wave vibratory system 300, to produce shock waves to, for example, image, characterize, examine, inspect, or obtain other information about a body 302. Shock wave vibratory system 300, an embodiment of shock wave vibratory system 200, utilizes vibrator device 1 to produce shock wave vibratory forces in vibratory force production operation 402 at a frequency controlled by the temporal control device 2. The temporal control device 2 may cause the vibrator device 1 to repeat production of the shock waves in any pattern including periodic patterns and trains of shock waves. The vibrator device 1 may generate cavitations within a fluid substance which collapse at supersonic velocities to produce the shock wave vibratory forces in vibratory force production operation 402. The shock waves are coupled, in vibratory force coupling operation 404, to body 302 via coupling device 7. Body 302 may be, for example, an organic subject, such as a human or other organic or inorganic body. The coupled shock waves propagate within body 302 in vibratory force propagation operation 406 by any mechanism including reflection, refraction, and approximately unaltered transmission. In reception and transduction operation 408, the transducer and reception device 9 receives propagated vibratory forces and transduces them into electronic signals, such as digital or analog signals. The orientation of coupling device 7 and reception and transducer device 9 with respect to the body and to each other is illustrative and may be varied to couple and detect signals using other spatial orientations. The body 302 may be disposed within the fluid substance within the housing of vibrator device 1, and the coupling device 1 be the fluid substance in the housing which applies the shock wave vibratory force to the body 302. The reception and transducer device 9 may, thus, be disposed in the housing to receive and transduce vibratory force received from the body 302.

In analyze operation 410, the analysis device 5 receives the transduced signals and, for example, extracts and determines information, such as imaging information, from the transduced signals. The analyzed information and transduced electronic signals may be recorded by recording device 4 in record operation 412 and displayed by display device 3 in display operation 414.

In temporal control operation 416, temporal control device 2 controls the number of shock waves produced by cavitating spaces in vibrator device 1 within a period of time. When vibrator device 1 is, for example, vibrator device 101 (FIG. 1) which includes piezoelectric drivers 108 and 110 and temporal control device 2 includes function generator and amplifier 112 to drive piezoelectric drivers 108 and 110, the frequency of shock wave generation by a cavitating space is approximately identical to the driving frequency of the piezoelectric drivers 108 and 110. When fluid substance 104 is water with approximately 20% of standard atmospheric gases present, the frequency of shock wave generation may be varied to, for example, approximately 20 to 25 kHz and particularly about 22–23 kHz, 40–50 kHz and particularly about 45 kHz, and 80-90 kHz and particularly about 80–85 kHz. In analyze operation 410, temporal control information from temporal control device 2 may be received and incorporated into the signal analysis of the transduced signals by analysis device 5. Additionally, the temporal control information may be recorded by recording device 4 in record operation 412 and displayed by display device 3 in display operation 414.

Spatial control device 6 controls the physical location of cavitating spaces produced within vibrator device 1 in spatial control operation 418. Spatial control device 6 may, for example, suspend the vibrator device 1 and locate the piezoelectric drivers 108 and 110 in various opposed locations. Spatial control information pertaining to, for example, the location of the cavitating spaces produced within vibrator device 1 may be received and incorporated into the signal analysis of transduced signals by analysis device 5 in analyze operation 410. Additionally, the spatial temporal control information may be recorded by recording device 4 in record operation 412 and displayed by display device 3 in display operation 414.

Figure 5:
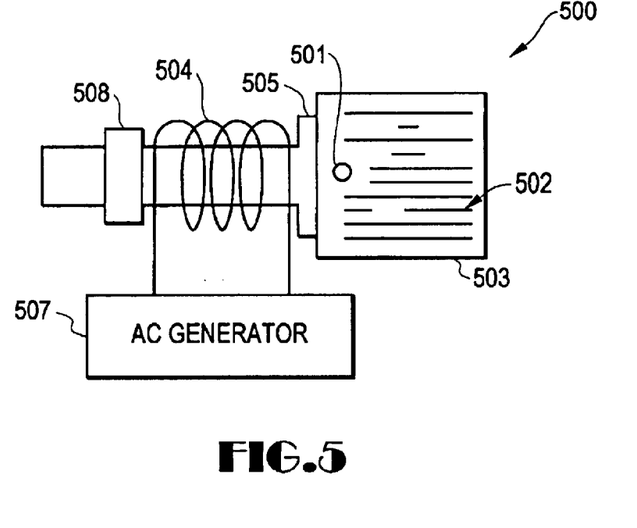
FIG. 5 is an embodiment of a vibrator device in the shock wave vibratory system of FIG. 2 which generates a cavitating space within a fluid substance using electromotive force.

The vibrator device 1 may be any device which creates shock waves within a fluid substance within a housing. Referring to FIG. 5, the vibrator device 1 may in one embodiment be vibrator device 500 which includes a solenoid 504 driven by an alternating current power source 507 which causes piston 505 to alternately exert force on fluid substance 502 and withdraw. Piston 505 may be a magnetostrictive material which deforms when magnetized or may be a conductor that travels within solenoid 504 and bushing 508 in response to the changing solenoid 504 magnetic field. The exertion and withdrawal of force on the fluid substance 502, such as liquid water, confined within housing 503 produces a cavitating space 501. As the cavitating space 501 collapses at supersonic velocity, shock waves are produced and originate in the region of the cavitating space 501. The shock waves may be utilized as described above in conjunction with shock wave vibratory system 200. The frequency of shock wave generation is controlled by an embodiment of temporal control device 2 which controls the motion of piston 505 in a well-known manner.

Figure 6:
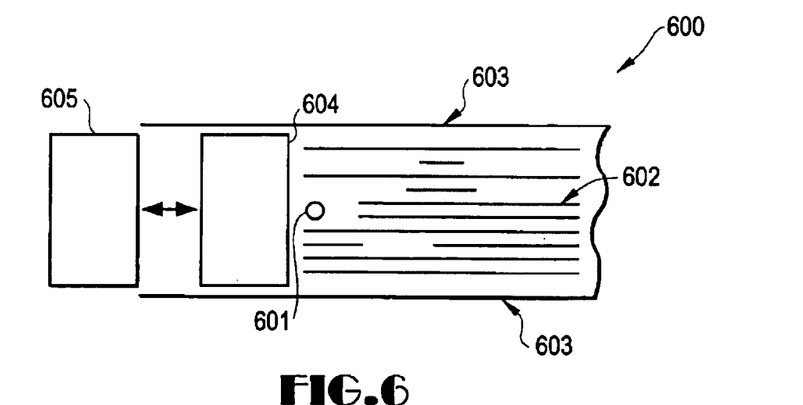
FIG. 6 is an embodiment of a vibrator device which generates a cavitating space within a fluid substance using a mechanically driven piston.

Referring to FIG. 6, the vibrator device 1 may in another embodiment be the vibrator device 600 which includes a mechanically driven piston 604 driven by motor 605 which may, for example, be a pump motor 605. Exertion and withdrawal of force on the fluid substance 602, such as liquid water, confined within housing 603 as piston 604 moves away and toward motor 605, respectively, produces a cavitating space 601. As the cavitating space 601 collapses, shock waves are produced which may be utilized as described above in conjunction with shock wave vibratory system 200. The frequency of shock wave generation is controlled by an embodiment of temporal control device 2 which controls the motion of piston 4 with motor 505 in a well-known manner.

Figure 7:
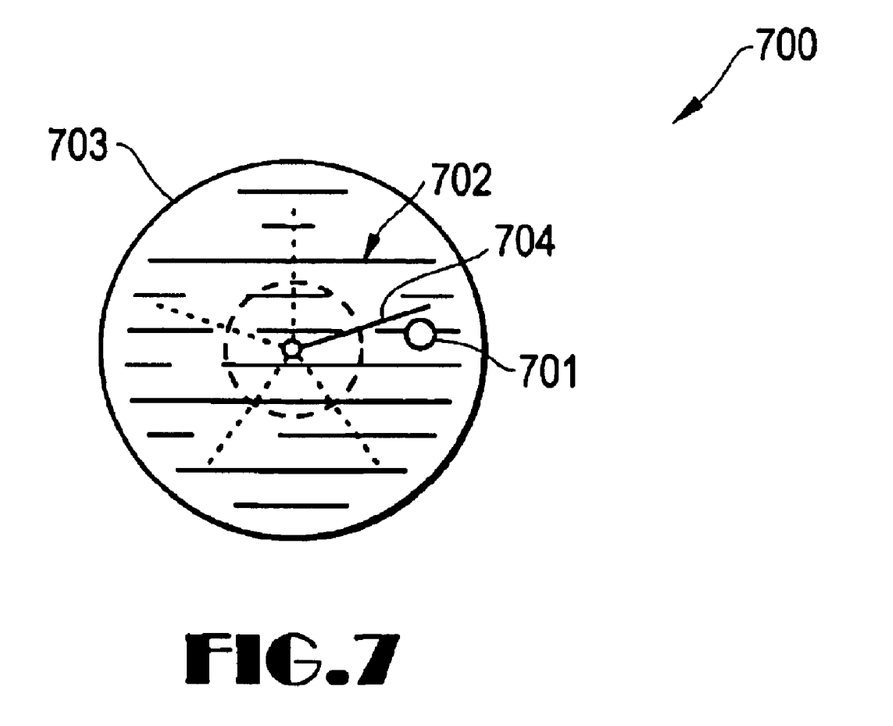
FIG. 7 is an embodiment of a vibrator device which generates a cavitating space within a fluid substance using a centrifugal pump.

Referring to FIG. 7, another embodiment of the vibrator device 1 is vibrator device 700 which includes a centrifugal impeller 704 preferably driven by a motor (not shown). As the impeller 704 rotates within fluid substance 702, such as liquid water, confined within housing 703, cavitating space 701 forms in the region proximate to the impeller driver 704 blades opposite the direction of travel. As the cavitating space 701 collapses, shock waves are produced which may be utilized as described above in conjunction with shock wave vibratory system 200. The frequency of shock wave generation is controlled by an embodiment of temporal control device 2 which controls the rotation speed of impeller 704 in a well-known manner.

Figure 8:
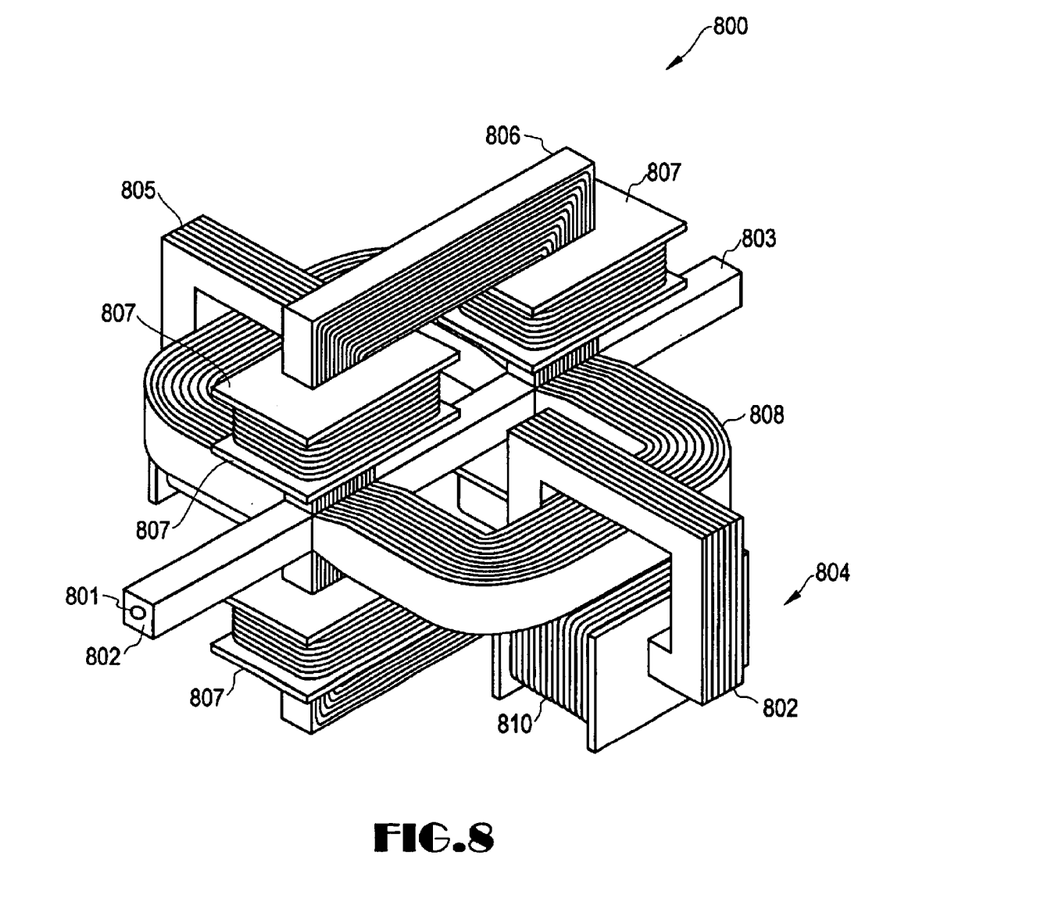
FIG. 8 is an embodiment of a vibrator device which generates a cavitating space within a fluid substance conductor using an electromagnetic induction pump.

Referring to FIG. 8, in another embodiment of vibrator device 1, vibrator device 800 includes an electromagnetic induction pump 804 containing a current transformer 805, magnetic circuit 806, field coils 807, secondary or armature circuit 808, and primary coil 810. The electromagnetic induction pump 804 utilizes alternating current to pump conductive fluid substance 802, such as liquid mercury, sodium, potassium, sodium and potassium alloys, and aluminum, within housing 803 in a well-known manner. As the fluid substance 802 is pumped, cavitating space 801 is produced and collapses to generate shock waves which may be utilized as described above in conjunction with shock wave vibratory system 200. The frequency of shock wave generation is controlled by an embodiment of temporal control device 2 which controls the flow rate of fluid substance 802 in a well-known manner.

Figure 9:
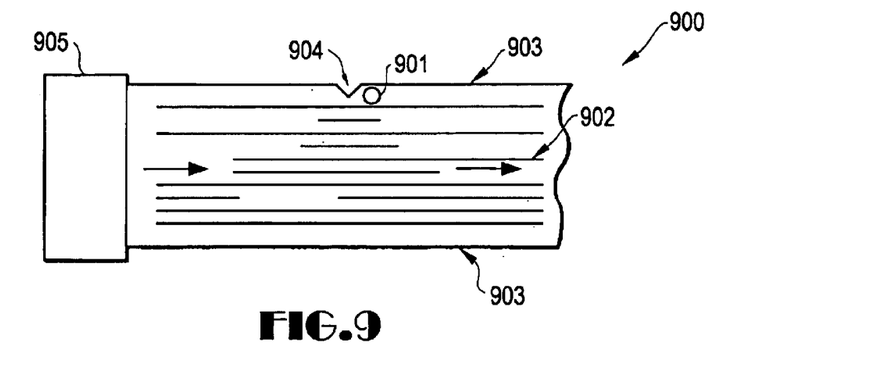
FIG. 9 is an embodiment of a vibrator device which generates a cavitating space within a moving fluid substance using an irregular region.

Referring to FIG. 9, in a further embodiment of vibrator device 1, vibrator device 900 includes a housing 903, which may be metal, that includes an irregularity 904 such as an indentation. As fluid substance 902, such as liquid water, is driven through housing 903 by a pump 905, the irregularity 904 restricts the flow of fluid substance 902, and a cavitating space is formed on the downstream side of irregularity 904. As the cavitating space 901 collapses, shock waves are produced which may be utilized as described above in conjunction with shock wave vibratory system 200. The frequency of shock wave generation is controlled by an embodiment of temporal control device 2 which controls the flow rate of fluid substance 902 and/or the irregularity 904 profile in a well-known manner. Fluid substance 902 is discharged through the distal end of housing 903 and may be recirculated within housing 903.

Figure 10:
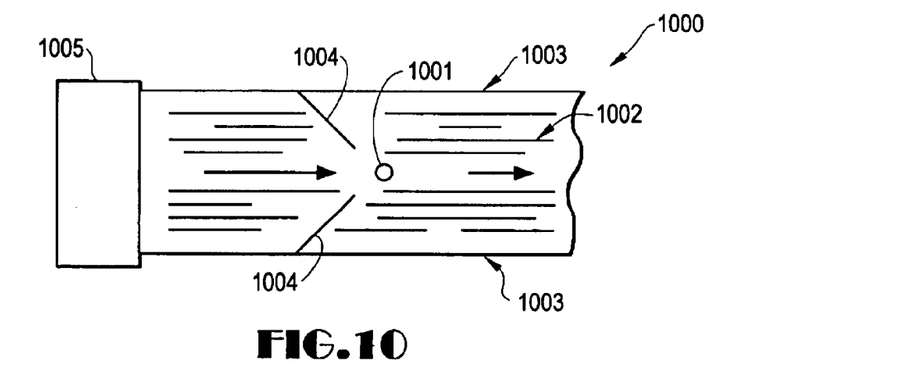
FIG. 10 is an embodiment of a vibrator device which generates a cavitating space within a moving fluid substance jet emitted from a nozzle.

Referring to FIG. 10, in another embodiment of vibrator device 1, vibrator device 1000 includes a nozzle 1004 within housing 1003, which may be metal. The nozzle 1004 may be an integral feature of housing 1003. As fluid substance 1002, such as liquid water, is forced through the nozzle 1004 in a jet stream by pump 1005, cavitating space 1001 is produced at the downstream exit of the nozzle 4. The cavitating space 1001 collapses to generate shock waves which may be utilized as described above in conjunction with shock wave vibratory system 200. The frequency of shock wave generation is controlled by an embodiment of temporal control device 2 which controls the flow rate of fluid substance 1002 and/or the configuration of nozzle 4 in a well-known manner. Fluid substance 1002 is discharged through the distal end of housing 1003 and may be recirculated within housing 1003.

Figure 11:
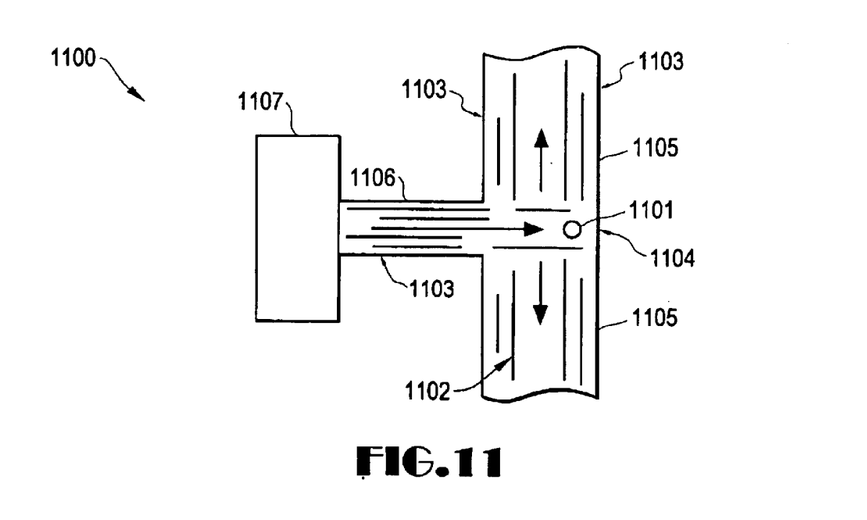
FIG. 11 is an embodiment of a vibrator device which generates a cavitating space within a moving fluid substance after impacting a surface.

Referring to FIG. 11, another embodiment of the vibrator device 1 is vibrator device 1100 which includes a housing 1103. The pump 1107 forces fluid substance 1102, such as liquid water, to impact against an inner surface 1104 of housing 1103 and rebound to produce a cavitating space 1101. After impact, the fluid substance 1102 is diverted to exit channels 1105 which may be of any configuration such as orthogonal to the entrance channel 1106. The cavitating space 1101 collapses to generate shock waves which may be utilized as described above in conjunction with shock wave vibratory system 200. The frequency of shock wave generation is controlled by an embodiment of temporal control device 2 which controls the flow rate of fluid substance 1102 in a well-known manner. Fluid substance 1102 is discharged through the distal ends of housing 1103 and may be recirculated within housing 1103.

Figure 12:
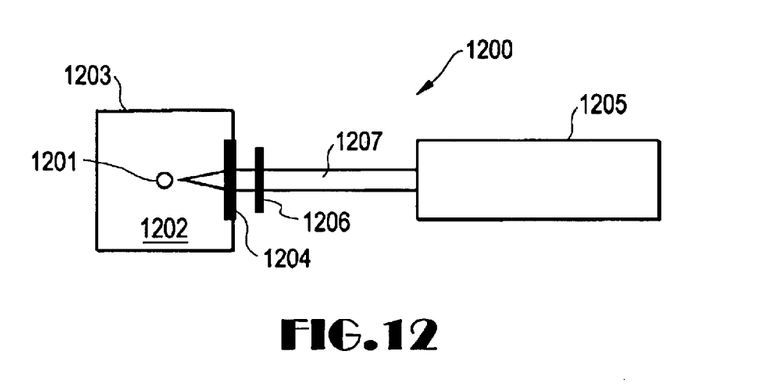
FIG. 12 is an embodiment of a vibrator device which generates a cavitating space within a fluid substance using a laser.

Referring to FIG. 12, another embodiment of the vibrator device 1 is vibrator device 1200 which includes a housing 1203, such as a glass cuvette, having a fluid substance 1202 such as liquid water confined within the housing 1203. An intense laser pulse 1207 from a laser 1205, such as a Q switched Nd:YAG (neodymium:yttrium aluminum garnet), is focused by lenses 1204 and 1206 into the fluid substance 1202. A plasma is thus generated in fluid substance 1202. The production of the plasma produces a cavitating space 1201, and the cavitating space 1201 collapses to generate shock waves which may be utilized as described above in conjunction with shock wave vibratory system 200. The frequency of shock wave generation is controlled by an embodiment of temporal control device 2 which controls the frequency of laser pulses from laser 1205 in a well-known manner. It will be recognized that electromagnetic wave generators may be utilized to produce a cavitating space 1201 within fluid substance 1202.

Figure 13:
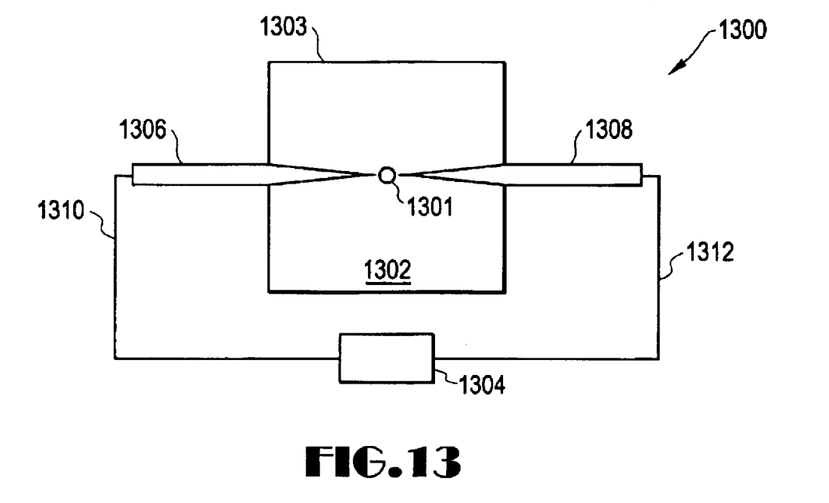
FIG. 13 is an embodiment of a vibrator device which generates a cavitating space within a fluid substance using a spark generated between a pair of electrodes.

Referring to FIG. 13, a further embodiment of the vibrator device 1 is vibrator device 1300 which includes a housing 1303 having a fluid substance 1302, such as liquid water, confined within the housing 1303. Spark generator 1304 is connected to electrodes 1306 and 1308 with conductive cables 1310 and 1312, respectively. The spark generator 1304 generates a potential difference between electrodes 1306 and 1308 sufficient to produce a spark between the electrodes 1306 and 1308. A static spark-generated cavitating space 1301 is thus produced in the proximity of the distal tips of electrodes 1306 and 1308. The cavitating space 1301 collapses to generate shock waves which may be utilized as described above in conjunction with shock wave vibratory system 200. The frequency of shock wave generation is controlled by an embodiment of temporal control device 2 which controls the frequency of sparks produced by spark generator 1304.

Figure 16:
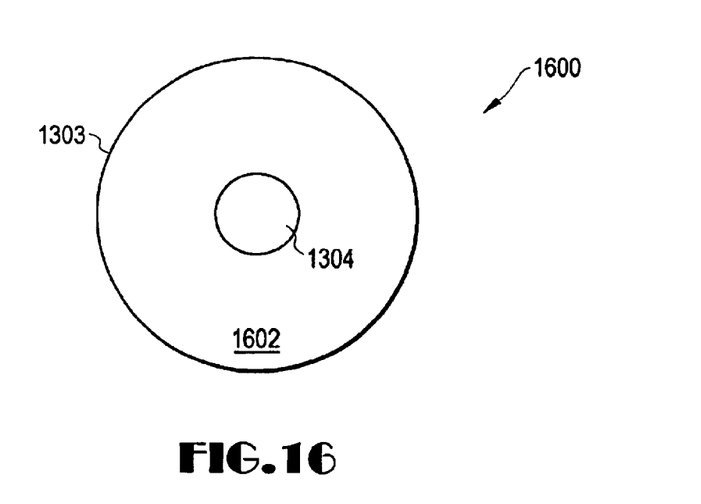
FIG. 16 is an embodiment of the vibrator device which generates a shock wave utilizing an explosive device within a housing.

Shock waves may also be produced and applied to a body in other ways such as by exploding a substance within a housing that will contain the explosion reaction components. Referring to FIG. 16, a further embodiment of the vibrator device 1 is a vibrator device 1600 which includes a housing 1603 having a fluid substance 1602, which may be gas, confined within the housing 1603. An explosive device 1604, which may be detonated by wireless communication or by inserting conductors (not shown) to carry an explosion initiation instruction to the explosive device 1604. After detonation of the explosive device 1604, a shock wave is generated which may be utilized as described above in conjunction with shock wave vibratory system 200.

Figure 14:
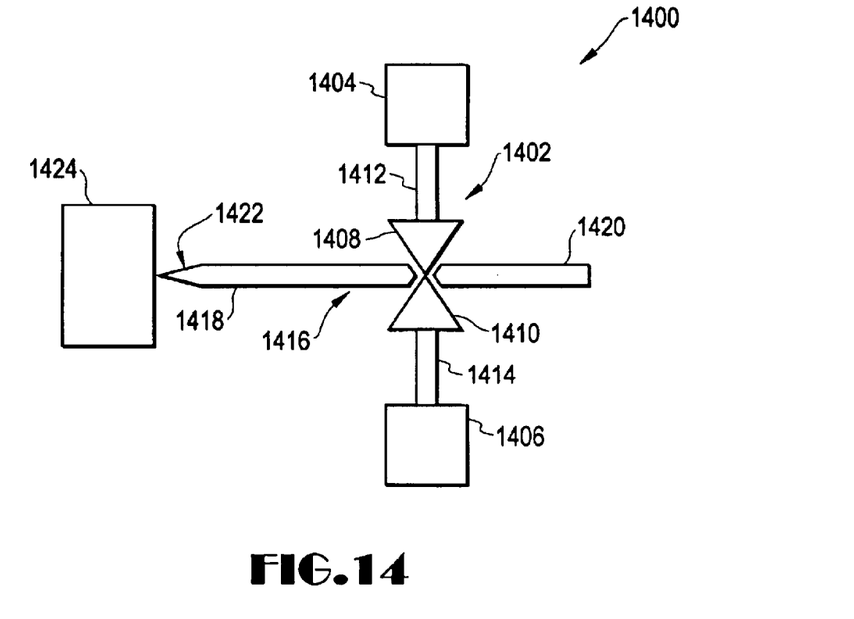
FIG. 14 is an embodiment of a vibrator device including a cutting device to generate a shock wave in a severed object which is transmitted to a body.

Referring to FIG. 14, a further embodiment of the vibrator device 1 is a vibrator device 1400 which includes a cutting device 1402 having drivers 1404 and 1406 to propel opposing blades 1408 and 1410, respectively, toward each other. As drivers 1404 and 1406 exert opposing forces on arms 1412 and 1414, respectively, blades 1408 and 1410 engage cutting shock wave transmitter 1416 which in one embodiment is metal wire such as copper, aluminum, or steel or alloys thereof. As drivers 1404 and 1406 continue to exert the opposing forces, blades 1408 and 1410 will sever shock wave transmitter 1416 into first segment 1418 and a second segment 1420. At the separation of the first segment 1418 from the second segment 1420, a shock wave is generated which propagates to the terminus or distal end portion 1422. The distal end portion 1422 may be shaped, for example, in a conical shape, to focus the shock wave onto the body 1424 which is proximate to, and in this embodiment, in contact with the body 1424. The blades 1408 and 1410 may be driven together at high rate of speed. The vibratory forces from the shock wave transmitted to the body 1424 may be applied to the body 1424 and utilized as described above in conjunction with shock wave vibratory system 200. Other geometrical configurations of blades 1408 and 1410 may be utilized, for example, blades 1408 and 1410 may replace the angled cutting surface in contact with the second segment 1420 with a straight surface. Additionally, the shock wave transmitter 1416 may have any cross-sectional geometry such as circular.

Figure 15:
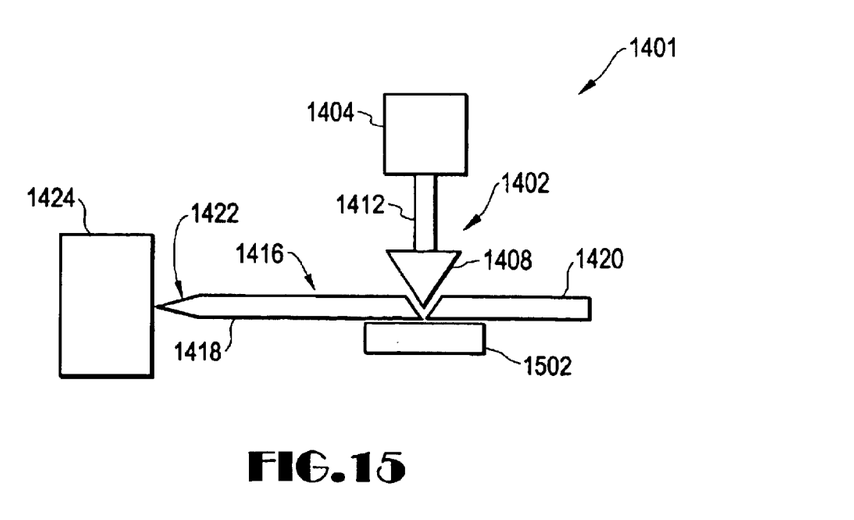
FIG. 15 is another embodiment of the vibrator device of FIG. 14.

Vibrator device 1400 may be modified in numerous embodiments to accomplish severing of shock wave transmitter 1416. For example, as shown in FIG. 15, vibrator device 1400 may be modified to vibrator device 1401 by replacing driver 1406, arm 1414, and blade 1410 with support 1502 to oppose the cutting action of blade 1408 and support shock wave transmitter 1416. Additionally, a feeder mechanism (not shown) may continually feed shock wave transmitters to be successively cut by cutting device 1402 or 1500. Additionally, vibrator device 1400 may include multiple cutting devices 1402 for cutting a shock wave transmitter as described above to generate multiple shock waves simultaneously or in predetermined patterns.

While the invention has been described with respect to the embodiments and variations set forth above, these embodiments and variations are illustrative and the invention is not to be considered limited in scope to these embodiments and variations. For example, the geometries of housings may be altered to accommodate, for example, different bodies to be analyzed, different operating environments, and optimization of shock wave production and propagation. Accordingly, various other embodiments and modifications and improvements not described herein may be within the spirit and scope of the present invention, as defined by the following claims.

What I claim as my invention is:

1. An apparatus for applying vibratory forces to at least one body to obtain at least one piece of information about the at least one body comprising at least one body and at least one shock wave transmitter and at least one shock wave transmitter cutter having at least one surface which engages and severs the at least one shock wave transmitter by locally exceeding at least one tensile strength of the at least one shock wave transmitter which causes to occur at least one supersonic or at least one sonic rate of severing of the at least one shock wave transmitter generating at least one shock wave vibratory force or at least on sine wave vibratory force which propagates within the at least one shock wave transmitter; and at least one coupling or application device disposed proximate to or attached to the at least one shock wave transmitter and disposed proximate to or attached to the at least one body which continues the propagation into the at least one body of the at least one shock wave vibratory force or the at least one sine wave vibratory force generated in the at least one shock wave transmitter by the at least shock wave transmitter cutter severing the at least one shock wave transmitter.

2. An apparatus as in claim 1 wherein the at least one shock wave transmitter is at least one piece of metallic solid or crystalline solid or amorphous solid or any combination thereof of any shape or is at least one segment of wire of any cross section or of any length or of any material or of combination of materials or combination of lengths or combinations of cross sections.

3. An apparatus as in claim 1 wherein the at least one shock wave transmitter cutter is at least one clipper with at least one wedge shaped edge or at least one flat edge or at least one curved edge which severs the at least one shock wave transmitter by pressing the at least one shock wave transmitter against at least one flat anvil or at least one curved anvil or at least one wedge shaped anvil or against at least one other cutter edge opposing the at least one wedge shaped or flat shaped or curved shaped shock wave transmitter cutter edge.

4. An apparatus as in claim 1 wherein the at least one shock wave transmitter cutter is powered by at least one motor or manual device of any design coupled by any linkage to the at least one shock wave transmitter cutter.

5. An apparatus as in claim 1 wherein the at least one coupling or application device is tapered or shaped to focus the propagation of the at least one shock wave vibratory force or the at least one sine wave vibratory force into the at least one body.

6. An apparatus as in claim 1 further comprising at least one feeder device powered by at least one motor or manual device of any design coupled by any linkage to or attached to the at least one shock wave transmitter cutter and coupled by any linkage to or attached to the at least one shock wave transmitter to reset in a position to be engaged again by the at least one shock wave transmitter cutter any portion of the at least one shock wave transmitter remaining after severing of at least one distal end of the at least one shock wave transmitter by the shock wave transmitter cutter.

7. An apparatus as in claim 1 further comprising at least one spatial controller device powered by at least one motor or manual device of any design coupled to the at least one coupling or application device to cause the at least one coupling or application device to propagate at least one shock wave vibratory force or at least one sine wave vibratory force into at least one predetermined location on or in the at least one body.

8. An apparatus as in claim 1 further comprising at least one temporal controller device triggered by at least one electromagnetic or manual device of any design coupled to the at least one shock wave transmitter cutter to cause the at least one shock wave transmitter cutter to engage and sever the at least one shock wave transmitter cutter during at least one predetermined or random period in time.

9. An apparatus as in claim 1 further comprising at least one reception or detection device to receive or detect the at least one shock wave vibratory force or the at least one sine wave vibratory force propagating in the at least one body from further propagation by the at least one coupling or application device of the at least one shock wave vibratory force or the at least one sine wave vibratory force generated and propagated in the at least one shock wave transmitter when engaged and severed by the at least one shook wave transmitter cutter or the at least one shock wave vibratory force or at least one sine wave vibratory force generated and propagated in the at least one shock wave transmitter when engaged and severed by the shock wave transmitter cutter or the at least one shock wave vibratory force or the at least one sine wave vibratory force further propagated by the at least one coupling or application device after the generation and the propagation of the at least one shock wave vibratory force or the at least one sine wave vibratory force in the at least one shock wave transmitter when engaged and severed by the at least one shock wave transmitter cutter.

10. An apparatus as in claim 1 further comprising at least one vibratory force to electromagnetic force transducer device such as a microphone or accelerometer to convert into analogous electromagnetic patterns the at least one shock wave vibratory force or the at least one sine wave vibratory force propagating in the at least one body from further propagation by the at least one coupling or application device of the at least one shock wave vibratory force or the at least one sine wave vibratory force generated and propagated in the at least one shock wave transmitter when engaged and severed by the at least one shock wave transmitter cutter or the at least one shock wave vibratory force or at least one sine wave vibratory force generated and propagated in the at least one shock wave transmitter when engaged and severed by the shock wave transmitter cutter or the at least one shock wave vibratory force or the at least one sine wave vibratory force further propagated by the at least one coupling or application device after the generation and the propagation of the at least one shock wave vibratory force or the at least one sine wave vibratory force in the at least one shock wave transmitter when engaged and severed by the at least one shock wave transmitter cutter.

11. An apparatus as in claim 1 further comprising at least one analysis device to derive and display or to derive and record at least one piece of information about the body such as to measure, test, image, characterize, examine, or inspect by performing at least one analysis operation on the at least one shock wave vibratory force or the at least one sine wave vibratory force propagating in the at least one body from further propagation by the at least one coupling or application device of the at least one shock wave vibratory force or the at least one sine wave vibratory force generated and propagated in the at least one shock wave transmitter when engaged and severed by the at least one shock wave transmitter cutter or the at least one shock wave vibratory force or at least one sine wave vibratory force generated and propagated in the at least one shock wave transmitter when engaged and severed by the shock wave transmitter cutter or the at least one shock wave vibratory force or the at least one sine wave vibratory force further propagated by the at least one coupling or application device after the generation and the propagation of the at least one shock wave vibratory force or the at least one sine wave vibratory force in the at least one shock wave transmitter when engaged and severed by the at least one shock wave transmitter cutter.

12. An apparatus as in claim 1 further comprising at least one recording device to store at least one piece of information about the at least one shock wave vibratory force or the at least one sine wave vibratory force propagating in the at least one body from further propagation by the at least one coupling or application, device of the at least one shock wave vibratory force or the at least one sine wave vibratory force generated and propagated in the at least one shock wave transmitter when engaged and severed by the at least one shock wave transmitter cutter or the at least one shook wave vibratory force or at least one sine wave vibratory force generated and propagated in the at least one shock wave transmitter when engaged and severed by the shock wave transmitter cutter or the at least one shock wave vibratory force or the at least one sine wave vibratory force further propagated by the at least one coupling or application device after the generation and the propagation of the at least one shock wave vibratory force or the at least one sine wave vibratory force in the at least one shock wave transmitter when engaged and severed by the at least one shock wave transmitter cutter.

13. An apparatus as in claim 1 further comprising at least one display device to present at least one piece of information about the at least one shock wave vibratory force or the at least one sine wave vibratory force propagating in the at least one body from further propagation by the at least one coupling or application device of the at least one shock wave vibratory force or the at least one sine wave vibratory force generated and propagated in the at least one shock wave transmitter when engaged and severed by the at least one shock wave transmitter cutter or the at least one shock wave vibratory force or at least one sine wave vibratory force generated and propagated in the at least one shock wave transmitter when engaged and severed by the shock wave transmitter cutter or the at least one shock wave vibratory force or the at least one sine wave vibratory force further propagated by the at least one coupling or application device after the generation and the propagation of the at least one shock wave vibratory force or the at least one sine wave vibratory force in the at least one shock wave transmitter when engaged and severed by the at least one shock wave transmitter cutter.

14. A method of applying vibratory force to at least one body to obtain at least one piece of information about the at least one body comprising the steps of generating at least one shock wave vibratory force or sine wave vibratory force within at least one shock wave transmitter by locally exceeding at least one tensile strength of the at least one shock wave transmitter with at least one shock wave transmitter cutter which engages the at least one shock wave transmitter to causes to occur severing at at least one sonic or at least one supersonic rate and propagating at least one of the generated shock wave vibratory forces or at least one of the produced sine wave vibratory forces towards at least one distal end of the at least one shack wave transmitter away from the at least shock wave transmitter cutter and applying the vibratory forces from the at least one generated shock wave or the at least one generated sine wave to the at least one body by continuing the propagation of the at least one generated shack wave or the at least one generated sine wave into the body by coupling between the at least one shock wave transmitter and the at least one body by the means of at least one gas material or at least one liquid material or at least one solid material or through at least one material in any state of matter for the purpose of obtaining at least one piece of information about the at least one body.

15. A method as in claim 14 further comprising the step of focusing the application of the vibratory forces from the at least one generated shock wave or the at least one generated sine wave to the at least one body with at least one tapered or shaped coupling device.

16. A method as in claim 14 comprising the step of producing the at least one shock wave transmitter or the at least one shock wave transmitter cutter or the at least one coupling from at least one piece of at least one metallic solid of any shape or size or at least piece of at least one crystalline solid of any shape or size or at least one piece of at least one amorphous solid of any shape or size or of any combinations of any solids of any shapes or sizes.

17. A method as in claim 14 comprising the step of producing the at least one shock wave transmitter from at least one segment of wire of any cross section or of any length or of any material or of any combinations of cross sections or combinations of lengths or combinations of materials.

18. A method as claim 14 comprising the step of producing the at least one shock wave transmitter cutter from at least one clipper with at least one wedge shaped cutter edge which severs the shock wave transmitter by pressing the at least one shock wave transmitter against at least one flat anvil or at least one curved anvil or at least one wedge shaped anvil or against at least one other cutter edge of any shape which opposes the at least one wedge shaped or flat shaped or curved shaped shock wave transmitter cutter edge.

19. A method as in claim 14 further comprising the step of feeding by motorized or manual means any portion of the at least one shock wave transmitter remaining after severing of at least one distal end of the at least one shock wave transmitter by the shock wave transmitter cutter into a position to be engaged by the at least one shock wave transmitter cutter.

20. A method as in claim 14 further comprising the step of positioning by motorized or manual means by spatially controlling the coupling of the at least one body to the at least one shock wave transmitter for the propagation of the at least one generated shock wave vibratory force or the at least one produced sine wave vibratory force proximate to at least one predetermined location on or in the at least one body.

21. A method as in claim 14 further comprising the step of timing by electromagnetic or manual triggering means the engaging and severing of the at least one shock wave transmitter by the at least one shock wave transmitter by temporally controlling the shock wave transmitter cutter to engage and sever the shock wave transmitter during at least one predetermined period in time.

22. A method as in claim 14 further comprising the step of receiving or detecting the at least one shock wave vibratory force or the at least one sine wave vibratory force generated within the at least one shock wave transmitter when engaged and severed by the shock wave transmitter cutter or the at least one shock wave vibratory force or the at least one sine wave vibratory force further propagated by the at least one coupling or application device after the generation and the propagation of the at least one shock wave vibratory force or the at least one sine wave vibratory force in the at least one shock wave transmitter when engaged and severed by the at least one shock wave transmitter cutter or to receive or detect the at least one shock wave vibratory force or the at least one sine wave vibratory force propagating in the at least one body from further propagation by the at least one coupling or application device of the at least one shock wave vibratory force or the at least one sine wave vibratory force generated and propagated in the at least one shock wave transmitter when engaged and severed by the at least one shock wave transmitter cutter.

23. A method as in claim 14 further the step of converting into analogous electromagnetic patterns by the use of one or more vibratory force to electromagnetic force transducers such as microphones or accelerometers the at least one shock wave vibratory force or the at least one sine wave vibratory force generated within the at least one shock wave transmitter when engaged and severed by the shock wave transmitter cutter or the at least one shock wave vibratory force or the at least one sine wave vibratory force further propagated by the at least one coupling or application device after the generation and the propagation of the at least one shock wave vibratory force or the at least one sine wave vibratory force in the at least one shock wave transmitter when engaged and severed by the at least one shock wave transmitter cutter or to receive or detect the at least one shock wave vibratory force or the at least one sine wave vibratory force propagating in the at least one body from further propagation by the at least one coupling or application device of the at least one shock wave vibratory force or the at least one sine wave vibratory force generated and propagated in the at least one shock wave transmitter when engaged and severed by the at least one shock wave transmitter cutter to communicate by electromagnetic signals at least one piece of information about the at least one body.

24. A method as in claim 14 further comprising the step of analyzing or deriving at least one piece of information about the body by performing at least one analysis operation on the at least one shock wave vibratory force or the at least one sine wave vibratory force generated within the at least one shock wave transmitter when engaged and severed by the shock wave transmitter cutter or at least one shock wave vibratory force or at least one sine wave vibratory force further propagated by the at least one coupling or application device after the generation and the propagation of the at least one shook wave vibratory force or the at least one sine wave vibratory force in the at least one shock wave transmitter when engaged and severed by the at least one shock wave transmitter cutter or to receive or detect the at least one shock wave vibratory force or at least one sine wave vibratory force propagating in the at least one body from further propagation by the at least one coupling or application device of the at least one shook wave vibratory force or the at least one sine wave vibratory force generated and propagated in the at least one shock wave transmitter when engaged and severed by the at least one shock wave transmitter cutter to measure, test, image, characterize, examine, or inspect the body.

25. A method as in claim 14 further comprising the step of recording to store at least one piece of information about the at least one shock wave vibratory force or the at least one sine wave vibratory force generated within the at least one shock wave transmitter when engaged and severed by the shock wave transmitter cutter or at least one shock wave vibratory force or at least one sine wave vibratory force further propagated by the at least one coupling or application device after the generation and the propagation of the at least one shock wave vibratory force or the at least one sine wave vibratory force in the at least one shock wave transmitter when engaged and severed by the at least one shock wave transmitter cutter or to receive or detect the at least one shock wave vibratory force or at least one sine wave vibratory force propagating in the at least one body from further propagation by the at least one coupling or application device of the at least one shock wave vibratory force or the at least one sine wave vibratory force generated and propagated in the at least one shock wave transmitter when engaged and severed by the at least one shock wave transmitter cutter.

26. A method as in claim 14 further comprising the step of displaying at least one piece of information about the at least one shock wave vibratory force or the at least one sine wave vibratory force generated within the at least one shock wave transmitter when engaged and severed by the shock wave transmitter cutter or at least one shock wave vibratory force or at least one sine wave vibratory force further propagated by the at least one coupling or application device after the generation and the propagation of the at least one shock wave vibratory force or the at least one sine wave vibratory force in the at least one shock wave transmitter when engaged and severed by the at least one shock wave transmitter cutter or to receive or detect the at least one shock wave vibratory force or at least one sine wave vibratory force propagating in the at least one body from further propagation by the at least one coupling or application device of the at least one shock wave vibratory force or the at least one sine wave vibratory force generated and propagated in the at least one shock wave transmitter when engaged and severed by the at least one shock wave transmitter cutter.

27. A method as in claim 14 comprising the step of powering the at least one shock wave transmitter cutter with at least one motor of any design by coupling by any linkage the at least one motor to the at least one shock wave transmitter cutter.

28. An apparatus as in claim 1 further comprising a cleaner device powered by at least one motor or manual device of any design coupled by any linkage to catch or transport away from the at least one shock wave transmitter or the at least one shock wave transmitter cutter or the at least one coupling or application device the distal end of the at least one shock wave transmitter when severed or after severing by the at least one shock wave transmitter cutter.

29. A method as in claim 14 further comprising the step of
    cleaning
    by motorized or manual means
    by catching or transporting away from the at least one shock wave transmitter or the at least one shock wave transmitter cutter or the at least one coupling device the distal end of the at least one shock wave transmitter when severed by the at least one shock wave transmitter cutter.

* * * * *